(12) United States Patent
Veeneman et al.

(10) Patent No.: US 8,606,654 B2
(45) Date of Patent: Dec. 10, 2013

(54) METHODS FOR PRODUCT REGISTERING IN A REGISTRY INCLUDING USE OF STORED VALUE CARDS

(75) Inventors: William J. Veeneman, Minneapolis, MN (US); Kathleen M. Veeneman, Minneapolis, MN (US)

(73) Assignee: AMS, Inc., Minneapolis, MN (US)

( * ) Notice: Subject to any disclaimer, the term of this patent is extended or adjusted under 35 U.S.C. 154(b) by 1235 days.

(21) Appl. No.: 11/241,774

(22) Filed: Sep. 29, 2005

(65) Prior Publication Data

US 2006/0080174 A1 Apr. 13, 2006
US 2012/0205444 A9 Aug. 16, 2012

Related U.S. Application Data

(63) Continuation-in-part of application No. 10/939,124, filed on Sep. 10, 2004, now abandoned, which is a continuation of application No. 10/411,433, filed on Apr. 10, 2003, now Pat. No. 6,793,130, which is a continuation of application No. 10/008,647, filed on Nov. 9, 2001, now Pat. No. 6,669,088.

(60) Provisional application No. 60/614,296, filed on Sep. 29, 2004.

(51) Int. Cl.
*G06Q 30/00* (2012.01)
(52) U.S. Cl.
USPC .... 705/26.8; 705/14.1; 705/14.36; 705/14.37

(58) Field of Classification Search
USPC .............. 705/26, 27, 1.1, 14.1, 14.27–14.28, 705/14.31, 4.36, 16–21, 26.1–27.2, 705/14.37–14.38
See application file for complete search history.

(56) References Cited

U.S. PATENT DOCUMENTS

| | | | | |
|---|---|---|---|---|
| 5,970,474 | A | * | 10/1999 | LeRoy et al. .................... 705/27 |
| 5,979,757 | A | * | 11/1999 | Tracy et al. .................... 235/383 |
| 6,484,147 | B1 | * | 11/2002 | Brizendine et al. ........ 705/14.27 |
| 6,669,088 | B2 | | 12/2003 | Veeneman |
| 6,793,130 | B2 | | 9/2004 | Veeneman |
| 2002/0128934 | A1 | * | 9/2002 | Shaer .............................. 705/27 |
| 2003/0074265 | A1 | * | 4/2003 | Oshima .......................... 705/26 |
| 2003/0089770 | A1 | * | 5/2003 | Veeneman .................... 235/383 |
| 2003/0154135 | A1 | * | 8/2003 | Covington et al. ............ 705/26 |
| 2003/0177054 | A1 | * | 9/2003 | Reinbold et al. ............... 705/10 |

OTHER PUBLICATIONS

"Shopnow.com Launches Gift Center and New Online Personal Shopper Assistants Across Shopnow Network". Business Wire. Nov 17, 1999.*

* cited by examiner

*Primary Examiner* — William Allen
(74) *Attorney, Agent, or Firm* — Dorsey & Whitney LLP; Stuart R. Hemphill, Esq.

(57) ABSTRACT

The present invention provides methods and systems for facilitating gift registry. A variety of systems are provided which make registering for gifts more efficient for consumers and retailers. These systems include an express registration card system and a reverse registry system. The methods associate the various systems with a common registry number. The express registration card system enables a registrant to register for gifts without requiring identification information first be given. The reverse registry enables registration of items already owned in order to inform potential gift givers of preferences.

19 Claims, 17 Drawing Sheets

TEMPORARY ID CARD/STORE DISPLAY HOLDER (OPPOSITE SIDE OF TEMPORARY ID CARD) POST CARD MAILER

FIG. 6a
(FRONT)
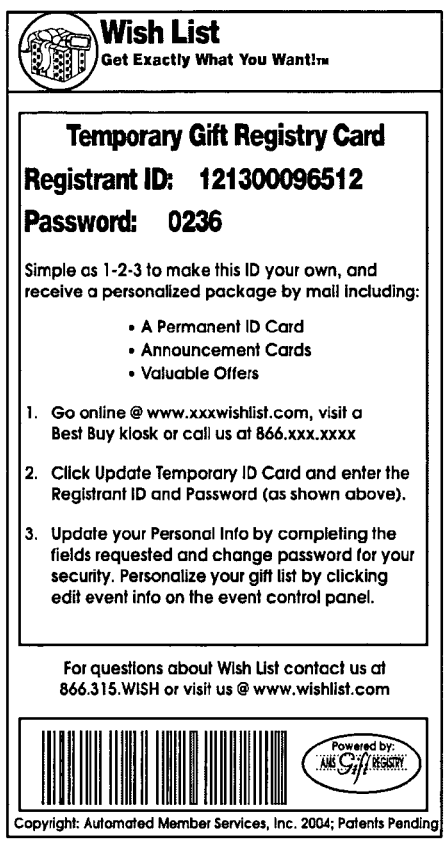
TEMPORARY ID CARD
FIG. 6b
(BACK)
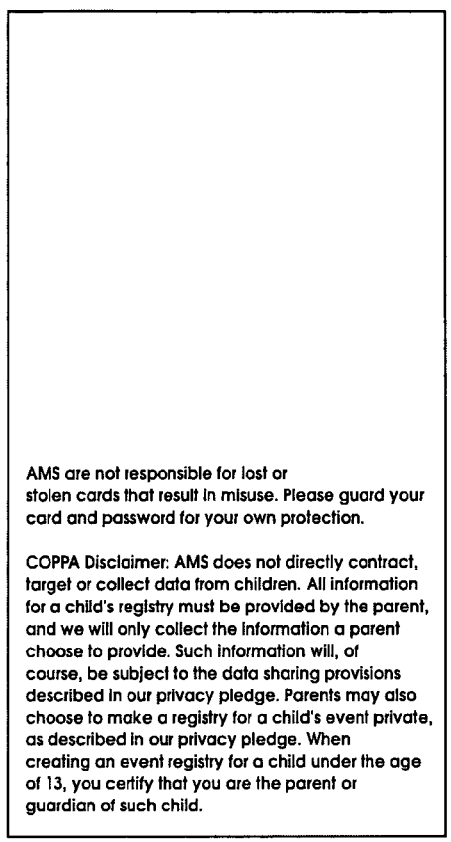
TEMPORARY ID CARD
(FRONT)
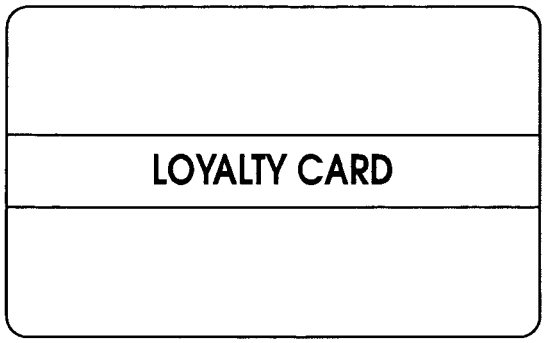
LOYALTY CARD REGISTRANT ID
FIG. 7a
(BACK)
LOYALTY CARD REGISTRANT ID
FIG. 7b

FIG. 8

METHODS FOR PRODUCT REGISTERING IN A REGISTRY INCLUDING USE OF STORED VALUE CARDS

CROSS-REFERENCE TO RELATED APPLICATION

This application claims the benefit of U.S. Provisional Application No. 60/614,296, filed on Sep. 29, 2004. This application is also a continuation-in-part of U.S. application Ser. No. 10/939,124, filed on Sep. 10, 2004 now abandoned, which is a continuation application of U.S. application Ser. No. 10/411,433, filed on Apr. 10, 2003, now issued as U.S. Pat. No. 6,793,130, which is also a continuation of U.S. application Ser. No. 10/008,647, filed on Nov. 9, 2001, now issued as U.S. Pat. No. 6,669,088.

FIELD OF THE INVENTION

The present invention relates to a method and system of gift registry. In particular, the present invention provides methods and systems for facilitating gift registry that streamline the registry process and reduce the equipment necessary to offer gift registration.

BACKGROUND OF THE INVENTION

Gift registries are well known. There are common situations in which a person creates a gift registry, for example in anticipation of a wedding or the birth of a child. Traditionally, for example, when a couple decides to marry, they will go to one or more stores, register for that store's registry, and select items at each store that they would like to receive as gifts. The selected items are then added to the registry. Each particular store registers the name of the couple and the gifts that they have selected. The registry is often nothing more than a log book. In recent times, the registry has become a computer database that is available for interaction by a touch screen or other type of computer in-store or online either at home, at the office or elsewhere.

Typically, a person creating a gift registry must first provide personal information, such as identification information (i.e., name, address, phone number, etc.) to the store to "register" or create an account before creating or completing a registry list. This registration process requires time and effort on the part of the registrant to provide the identification information including possibly standing in a line to speak with the appropriate person at the store, waiting for the information to be entered or the list to be printed, and any number of other complications, such as printer or computer malfunctions. The registration process further frequently requires time and effort on the part of a store employee to enter information from the registrant and create the registry.

FIG. 1 shows a typical configuration of equipment necessary to facilitate gift registration in a store according to the prior art. Customers typically have limited time to utilize a store gift registry and when complications present themselves, there is frustration and possibly abandonment of the registry process. There is a need in the art, therefore, for a gift registry that permits registration and addition of gift items to the registry without requiring registration.

Currently, gift registries are used for storing and providing lists of gifts which the registrant desires to receive. Thus, the gift registry lists desired items and, typically, whether such items have been purchased. Gift registries of the prior art do not list items owned by the registrant that were not placed on the registry. Therefore, there is a need in the art for a gift registry system that allows registrants to register product items that they currently own.

BRIEF SUMMARY OF THE INVENTION

The present invention provides methods and systems for facilitating gift registry. A variety of systems are provided which make registering for gifts more efficient for consumers and retailers. These systems include an express registration card system and a reverse registry system. The systems may be independent of the others or may incorporate some or all of the features of another system.

Gift registering with the express registration card system comprises providing an express registration card having an express registration number, receiving selected product information from a registrant, and associating the selected product information with the express registration number to create a registry list. The registrant may provide identification information after association of the selected product information with the express registration number. The identification information is then associated with the registry list.

Using the reverse registry system, a user provides registry account information and provides information related to the products already owned to create a reverse registry. The reverse registry may be used by potential buyers to evaluate the registrant's tastes and choose a gift accordingly. The registrant may further provide information related to desired products and create a registry list for association with reverse registry.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

BRIEF DESCRIPTION OF THE DRAWINGS

FIG. 5b illustrates a back side of the express registration card of FIG. 5a.

FIG. 6a illustrates a front side of an express registration card in accordance with a further embodiment of the present invention.

FIG. 6b illustrates a back side of the express registration card of FIG. 6a.

FIG. 7a illustrates the front side of a loyalty program card or membership card express registration card in accordance with one embodiment of the present invention.

FIG. 7b illustrates the back side of the loyalty program card or membership card express registration card of FIG. 7a.

FIG. 8 is a screen shot of an interactive screen at a kiosk or website for use with an express registration card system in accordance with one embodiment of the present invention.

DETAILED DESCRIPTION

The present invention provides methods and systems for facilitating gift registry. A variety of systems are provided which make registering for gifts more efficient for consumers and retailers. These systems include an express registration card system and a reverse registry system. The systems may be independent of the others or may incorporate some or all of the features of another system. Further, each of these systems may be used as a single-store registry system or a multi-store registry system. U.S. Pat. No. 6,669,088, entitled "Multi-Merchant Gift Registry" discloses a multi-store registry system and is herein incorporated by reference.

Figure 18:
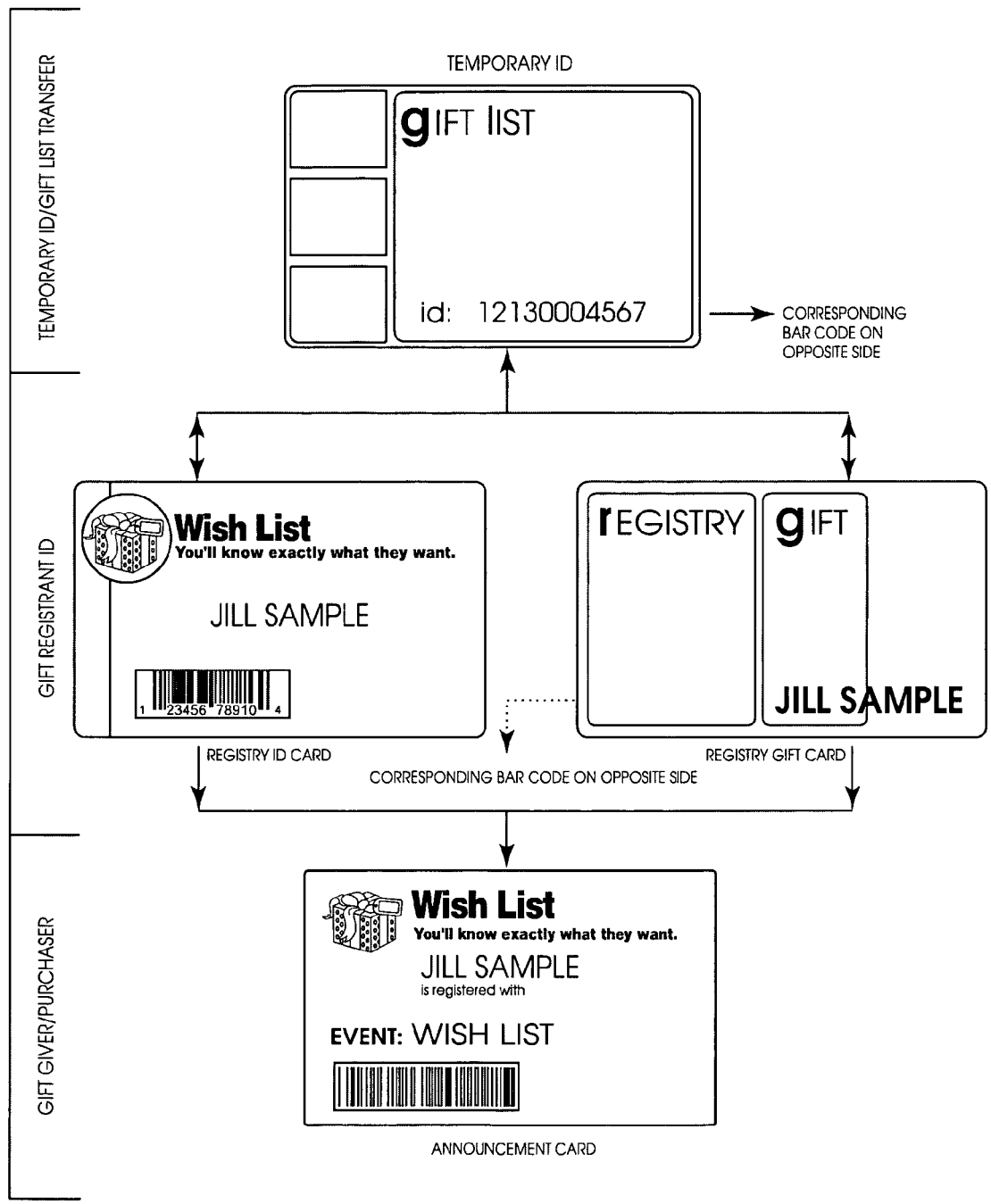
FIG. 18 illustrates the several registry cards.

FIG. 18 illustrates a variety of registry cards that may be used with the system of the present invention. An express registration card 3, described below, is a card for creating a gift registry without requiring identification information. A registrant ID card 5 is a personal card associated with a gift registry and may result from the express registration card system, may be created pursuant to standard gift registry registration, or may be otherwise provided. A registry gift card 7 is a card having monetary value and may be referred to as a stored value card. The registry gift card may be associated with a gift registry. An announcement card 9 is a card that may be mailed to potential purchasers that provides information about the registry. The announcement card may be associated with a gift registry created by any means.

The systems may be use any suitable gift registry system as a backbone. Generally, a gift registry system includes a computer system that contains identifying information for the registry. The identifying information may comprise a registry number or may comprise identification information personal to the registrant. A portable input and real time communication or storage device is provided in each retailer, in a common area of a shopping center, or in any suitable manner that can be used by the registrant in one or more stores. In one embodiment, the portable input and real time communication or storage device is a hand held scanning device. The portable input and storage device is capable of receiving and storing information regarding gifts that the registrant desires to receive as presents, as well as, in the case of a multi-merchant registry, information necessary to identify the particular merchant which carries a desired gift. A transfer device is provided, in communication with the computer system, for receiving and transferring information from the portable input and storage device regarding the registrant's desired gifts. A prospective purchaser interface device is provided that allows the prospective purchaser to view the registry list.

Figure 1:
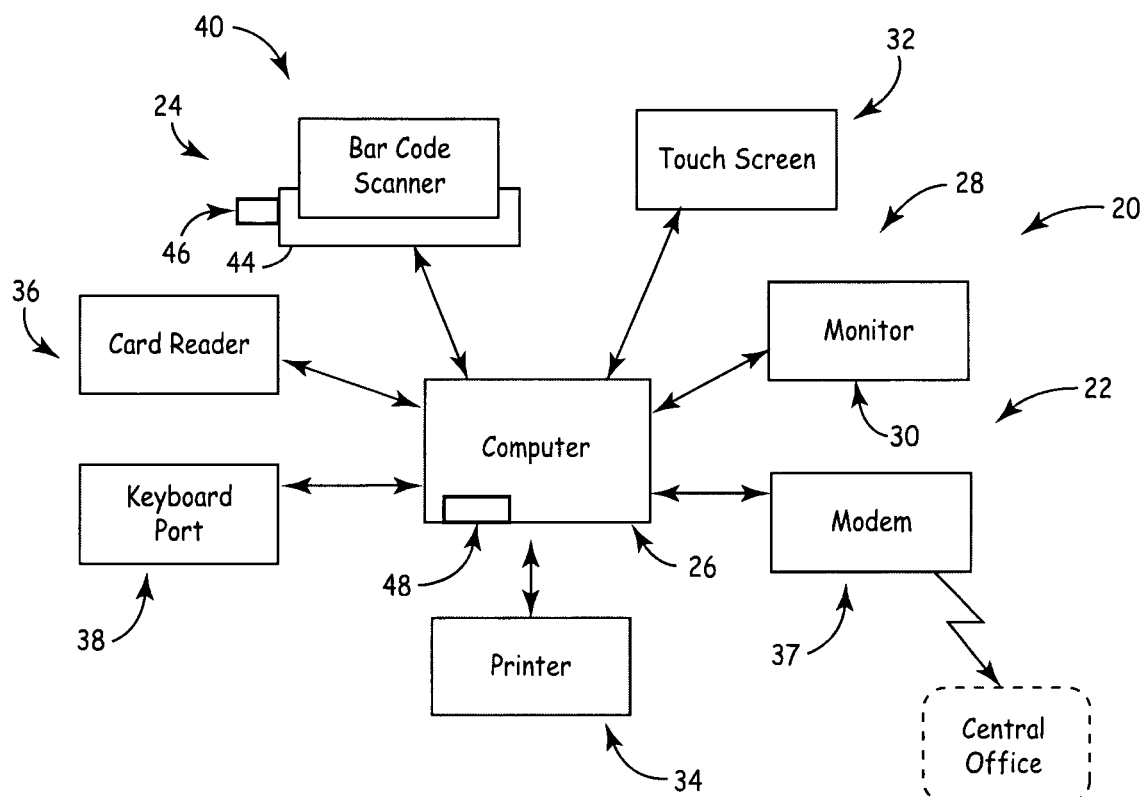
FIG. 1 is a block diagram of a typical registry system.
Figure 2:
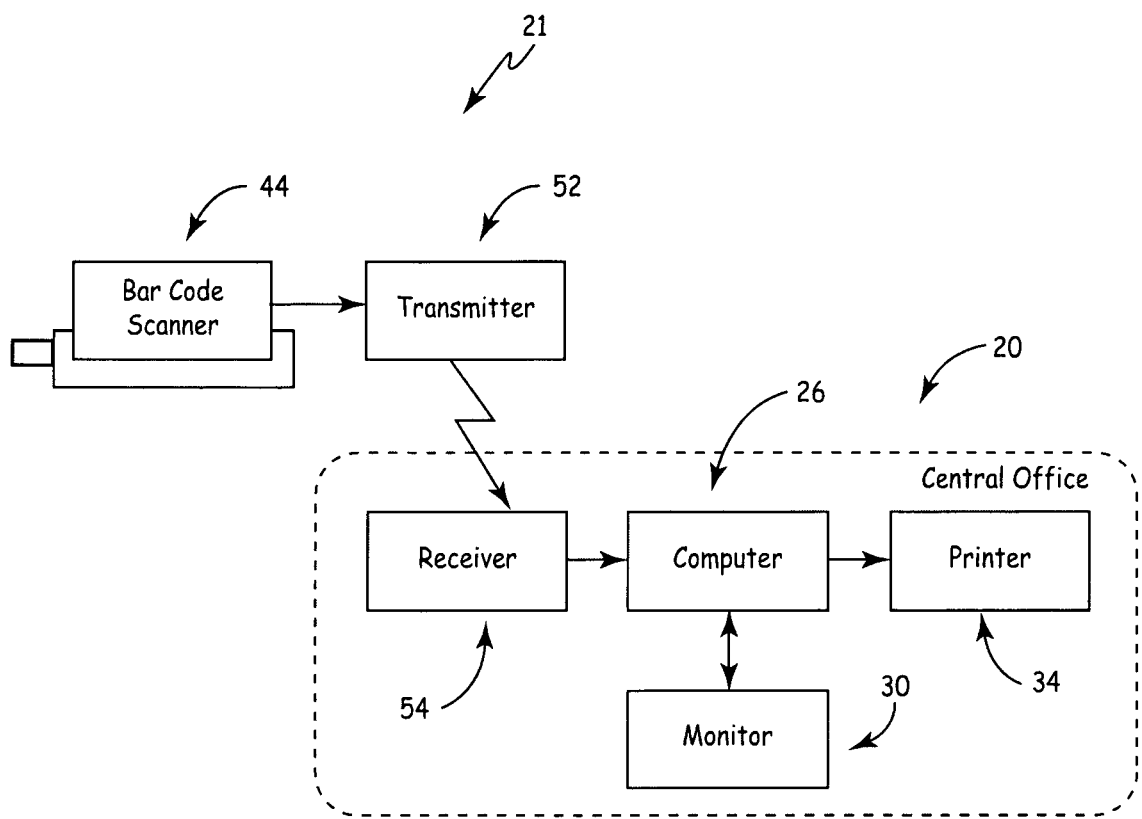
FIG. 2 is a block diagram of a registry system for use with the present invention.

A gift registry system suitable for use with the systems of the present invention is designated generally by the numeral 21 in FIG. 2. The gift registry system 21 comprises a computer 26 and bar code scanner 40. The bar code scanner 40 may be used to obtain Universal Product Code (UPC) information about possible gift items. The UPC information allows the computer 26 to categorize products or potential gift items, so that a gift buyer can have the option of obtaining a list of gifts of a particular category. The scanner 24 further includes a mechanism for transferring the information to the computer 26 such as a wireless access port.

The scanner may be a handheld scanning device or a data reader capable of receiving, transmitting, and/or storing information regarding desired products or services. Alternatively, the scanner or reader may be any portable input and storage device capable of receiving, transmitting, and/or storing information regarding desired products or services.

The computer 26 may include a receiver 54, a printer 34, and a monitor 30, and a user interface. The user interface may comprise a touch screen or a keyboard. The computer 26 includes software (not shown) and may include a modem for communication with a central processing mechanism, network, or mainframe.

The software includes a first mechanism for receiving the first information about the registry such as a registry number, a second mechanism for receiving second information about possible gift items, and a third mechanism for receiving third information comprising identification information, if provided. The software also includes a mechanism for associating the first information, the second information, and the third information (if provided). In addition, the software may include a mechanism for obtaining first, second, or third information from a variety of stores or locations.

The computer 26 and bar code scanner 40, in conjunction with the software, may include a verification component for verifying that the items on which information has been entered are those desired by the registrant. This may be done, for example, by displaying some portion the information obtained from the scanned bar codes for review. The verifying component may comprise a display mechanism on the bar code scanner 40.

Other suitable gift registry systems that may be used as a backbone for the systems of the present invention are disclosed in U.S. patent application Ser. No. 10/66,754, filed on Sep. 15, 2003, which is a continuation in part of U.S. patent application Ser. No. 10/212,323, filed on Aug. 5, 2002, which is a continuation in part of U.S. application Ser. No. 10/008, 647, filed on Nov. 9, 2001, now issued as U.S. Pat. No. 6,669,088 and U.S. application Ser. No. 10/939,124, filed on Sep. 10, 2004, which is a continuation application of U.S. application Ser. No. 10/411,433, filed on Apr. 10, 2003, now issued as U.S. Pat. No. 6,793,130, which is also a continuation of U.S. application Ser. No. 10/008,647, filed on Nov. 9, 2001, now issued as U.S. Pat. No. 6,669,088, all of which are herein incorporated by reference.

Express Registration Card System

The express registration card system enables creation of a gift registry without requiring the registrant to provide identification information prior to selection of gifts for the registry. Thus, the registrant may first create a wish list or multiple wish lists of desired items and subsequently provide registration or account information at a time that is convenient. In an alternative embodiment, the registrant need not provide identification information at any time.

The express registration card system comprises an express registration card having a number thereon. The number may be referred to as an express registration number. The express registration number may be a randomly generated number. In use, a registrant uses the express registration number to activate a registry. The registrant adds items to the registry associated with the express registration number. In a specific embodiment, the express registration card includes a bar code. The bar code may be scanned by a scanner associated with a gift registry. Scanning of the bar code identifies the express registration number.

The registrant may later link identification information to the express registration number and, thus, to the registry associated with the express registration number. Alternatively, the registrant may not link identification information to the express registration number or to the registry and may access the registry and give people access to the registry based solely on the express registration number. This is useful in situations where a registrant is uncomfortable sharing personal information.

After linking of the express registration card with identification information, a personal card may be sent to the registrant linked to the registry. For example, a welcome kit including the personal card, a gift card (stored value card), and/or other promotional items may be sent from the merchant to the registrant. The welcome kit may further include registry announcements that may be sent to potential gift buyers informing the gift buyer of the registry. Thus, for example, a registrant may create a baby registry using a gift card. The registrant may associate identification information with the baby registry and, upon such association, a welcome kit may be sent to the registrant. The welcome kit may include a personal card, a gift card in the value of $10.00 towards the purchase of baby items, and registry announcements for inclusion in, for example, a baby shower invitation.

The registrant may add to the registry subsequent to the initial creation of the registry. For example, the registrant may continue adding to the registry using either the express registration number or identification information. Using the express registration number, the user returns to the store (or stores) of the registry, identifies the registry using the express registration number, and adds items to the registry.

Alternatively, the registrant may use a second express registration card to create a new registry associated with the express registration number on the second express registration card (or second express registration number). The registrant may then link identification information to the second express registration number. If the same identification information is already entered for another express registration number, the user may be given the option of combining the registry lists. Alternatively, the user may directly link the second express registration number to the first express registration number without requiring reentry of the identification information.

This is helpful because a registrant may not carry the original express registration card with them. Without such card, the registrant may be required to acquire a copy of their registration form or otherwise identify the registry in order to add new items to the registry. This is time consuming. Further, there may be a lack of functioning equipment or the availability of equipment or personnel to assist which may lead to the registrant abandoning adding to the registry.

Figure 3:
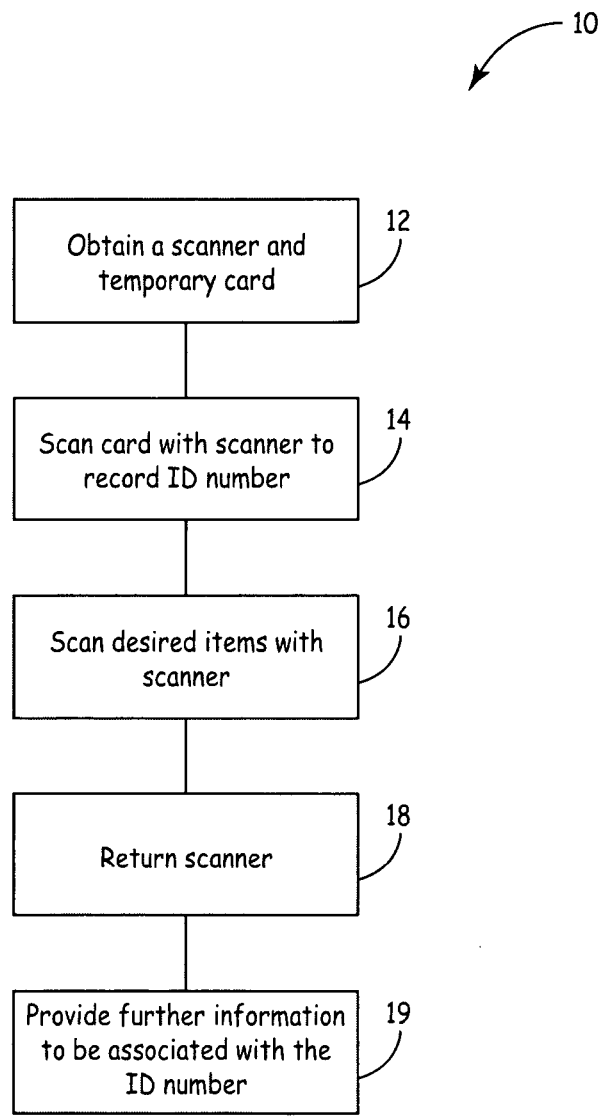
FIG. 3 is a block diagram of a system and method of gift registry, in accordance with one embodiment of the present invention.
Figure 4:
FIG. 4 illustrates an express registration card in accordance with one embodiment of the present invention.
Figure 5A:
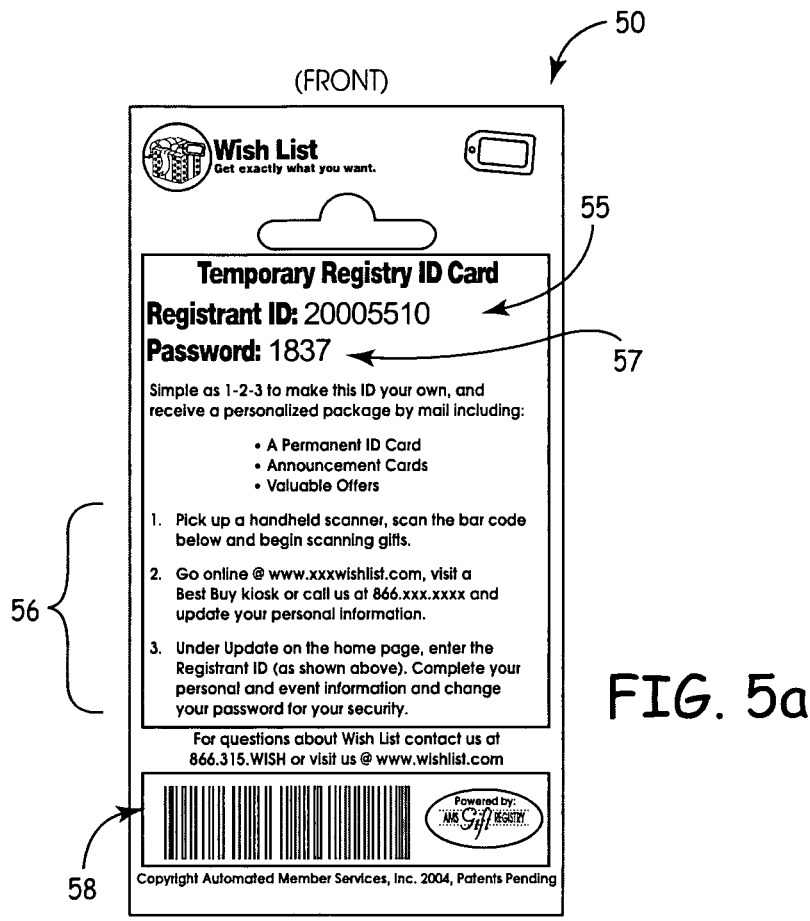
FIG. 5a illustrates a front side of an express registration card in accordance with one embodiment of the present invention.
Figure 5B:
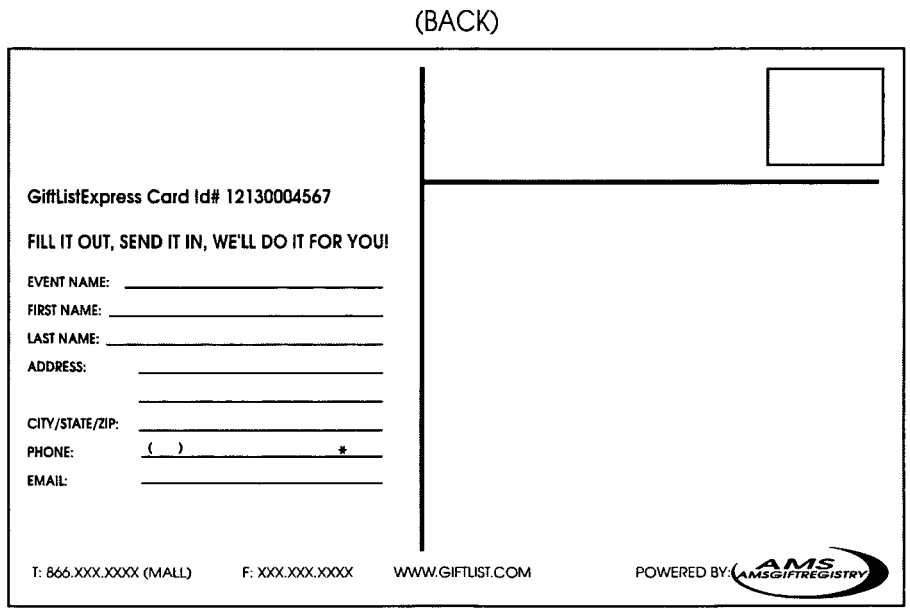

FIG. 3 is a flow chart illustrating a method of using the express registration card. A user obtains a portable scanner and an express registration card, as indicated at box 12. The portable scanner and express registration card may be available at a gift registry station/kiosk, at a gift registry location in a store or mall, or at any other suitable location. In a further alternative, the express registration card may be obtained online, by e-mail, via insertion in a product, via distribution as a marketing device, or by mail. FIG. 4 illustrates a store display holder for an express registration card. In yet a further embodiment, a retailer card (such as a loyalty program card or membership card) may be used as an express registration card, shown in FIGS. 7a and 7b. FIGS. 5a, 5b, 6a, 6b, 7a, and 7b illustrate exemplary embodiments of suitable express registration cards. FIGS. 5a and 5b illustrate an express registration card with a post card, mailing configuration on the reverse side.

The registrant enters the express registration number into the portable scanner, as indicated at box 14. This may be done, for example, by scanning a bar code on the card with the scanner. Once the express registration number has been input into the scanner, the registrant may use the portable scanner to scan any desired products or services to create the registry list, as indicated at box 16. Thus, for example, the registrant can move about the store or stores, identify desired products or services and use the portable scanner to scan the bar code associated with those products or services, thereby adding the desired products or services to the registry list. The scanner associates each identified product or service with the express registration number, thereby creating the registry. It should be noted that while an example is given of scanning desired products to add to the registry list, the products may be otherwise added to the registry list. When the registrant has added all products or services identified at that time, the registrant may return the scanner to its original location or give it to a store employee, as indicated at box 18.

In an alternative embodiment, the registrant may enter the express registration number on a registry system of a website. The registrant may then select products on the website for addition to a registry list. The express registration number is associated with the registry list and may be used to identify the registry list.

After initial creation of the registry list, the registrant may provide additional information to be associated with the express registration number, as indicated at box 19. This information may be comprise identification information.

The registrant can enter their identification information in any suitable manner. For the purposes of illustration, examples of suitable manners for entering such information are discussed. These examples are not intended to be exhaustive or limiting. The registrant may enter the information at a store kiosk, cash register terminal, at an Internet website, by mail, or by phone. Thus, the registrant may enter identification information at the store kiosk. Alternatively, the registrant may access the Internet website after leaving the store or mall to provide identification information. For instance, the registrant may go home and complete the registration process by logging onto the website at a time more convenient to the user. The registrant may call a phone number to provide identification information. In this embodiment, the registrant may provide the identification information via voice and/or the dial pad. The registrant can provide the necessary information via U.S. Mail or facsimile.

Figure 8:
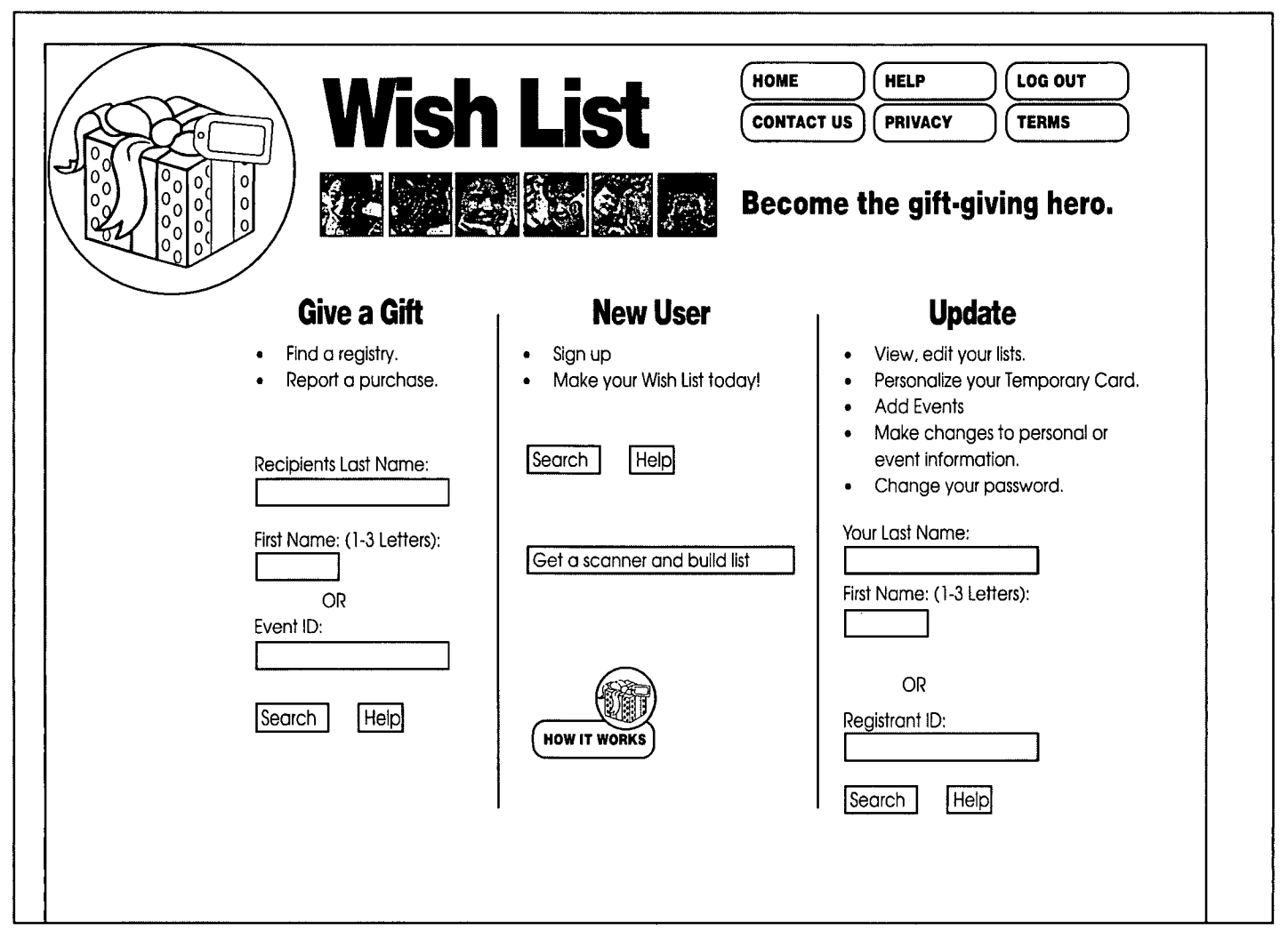

A screen shot of an interactive screen provided at a store kiosk or on the internet is depicted in FIG. 8. As shown, a registrant may enter the express registration number (registrant ID) or identification information such as first and last names to update their registry list. Further, a registrant may initiate their registry list with the interactive screen. This may entail, for example, entering identification information.

In some cases, the registrant may wish to remain anonymous, and so would choose not to provide identification information for linking with the express registration number. In such situation, the express registration number alone is used to identify the registry.

Figure 10:
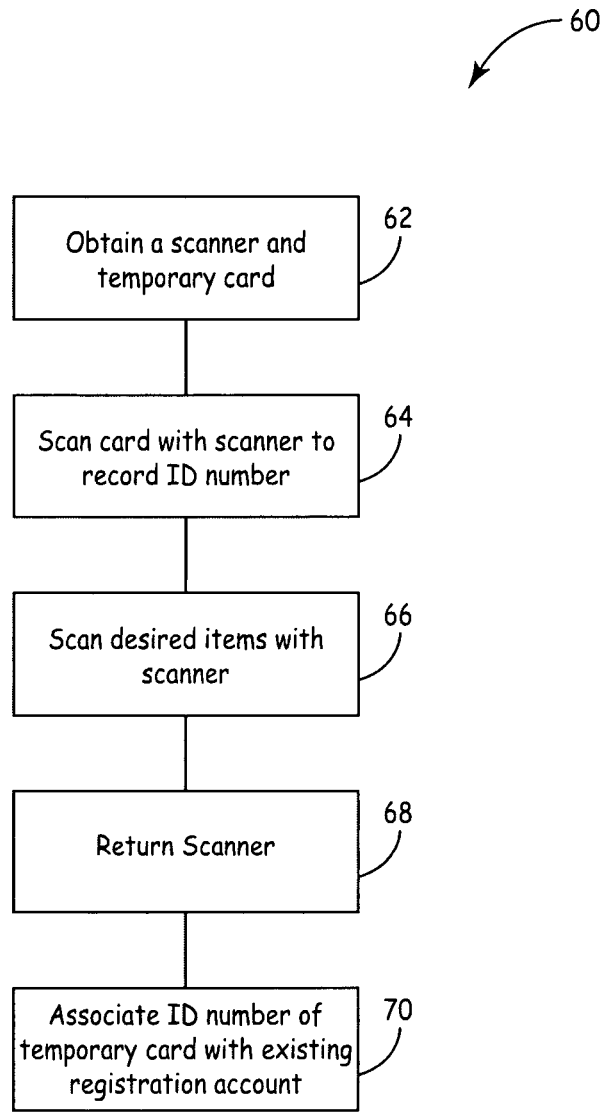
FIG. 10 is a block diagram of an express registration card system in accordance with a further embodiment of the present invention.

In an alternative embodiment, shown in FIG. 10, the registrant provides identification information to the registry system prior to creation of the registry list. The registrant uses an express registration card to select items for the registry list, thereby associating the registry list with the express registration card. The registrant may then associate the previously entered identification information with the created registry list.

Thus, the registrant establishes a registration account by providing identification information. This account may be referred to as an existing registration account. The registrant obtains a portable scanner and an express registration card, as indicated at box 62. The registrant enters the express registration number, for example via scanning a bar code on the card with the scanner, as indicated at box 64. Once the express registration number has been input to the scanner, the registrant adds items to a registry list that is associated with the express registration number, as indicated at box 66. For example, the registrant may scan desired products or services with the scanner. The scanner associates each identified product or service with the express registration number. When the registrant has added all products or services identified at that time, the registrant may return the scanner to its original location or give it to a store employee, as indicated at box 68. Subsequently, the registrant may associate the registry list associated with the express registration number with the existing registration account, as indicated at box 70, which can also be referred to as "association."

Further, a registrant may use a different express registration card each time they scan items and the system enables the registrant to associate the various cards to a single registry account. Thus, for example, after creation of a first registry list with a first express registration card, a registrant may create a second registry list with a second express registration card. The registrant may then consolidate the first and second registry lists into a single list. This may be done via a prompt for consolidation if each of the first and second registry lists are associated with the same identification information. Alternatively, the registrant may affirmatively instruct the system to consolidate the first and second registry lists.

Similarly, a prior registrant may have another personal account card (such as a loyalty program card or membership card) associated with an existing registry account. If the registrant forgets their personal account card or otherwise visits the store associated with that personal account card without the personal account card, the registrant may use an express registration card during that visit and subsequently associate the registry associated with the express registration card with the existing account.

Figure 11:
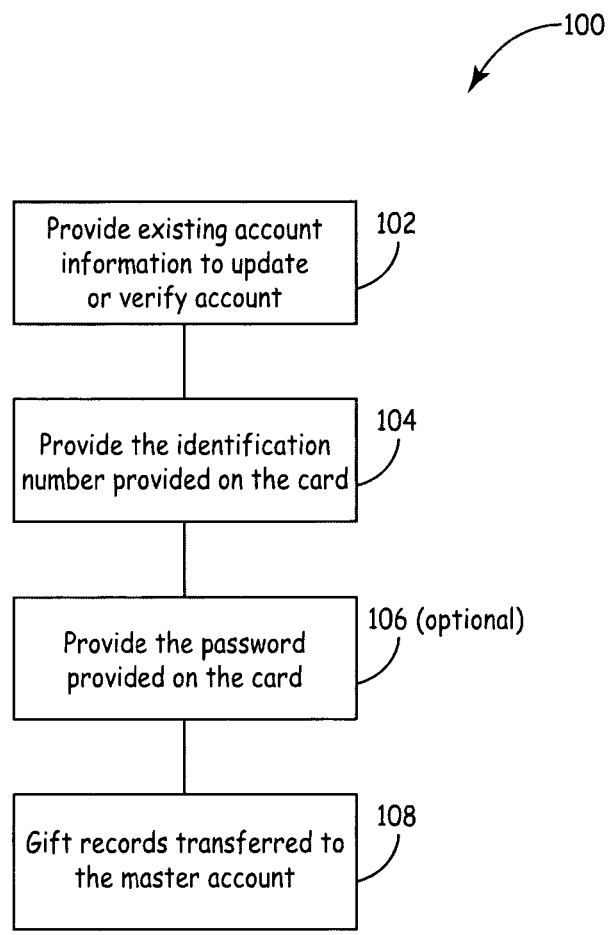
FIG. 11 is a block diagram of a method of association in accordance with one embodiment of the present invention.

The registrant may accomplish association as depicted in FIG. 11. Association can include providing existing account information, as indicated at box 102. Additionally, providing the identification number provided on the express registration card, as indicated at box 104. Furthermore, in an alternative embodiment, the user also provides a PIN or password that is also provided on the card, as indicated at box 106, or by a retailer (separately from the card). This process can be used for one or more express registration cards for the same user.

This process of association, or associating a registry list associated with an express registration number with a preexisting registration account, can be in any suitable manner. For example, the registrant may use store kiosk, an Internet website, a phone number, U.S. Mail, or facsimile. During this process, multiple Temporary ID's can be associated with the individual registrant or with their dependents who may also associated with the same master account.

Figure 9:
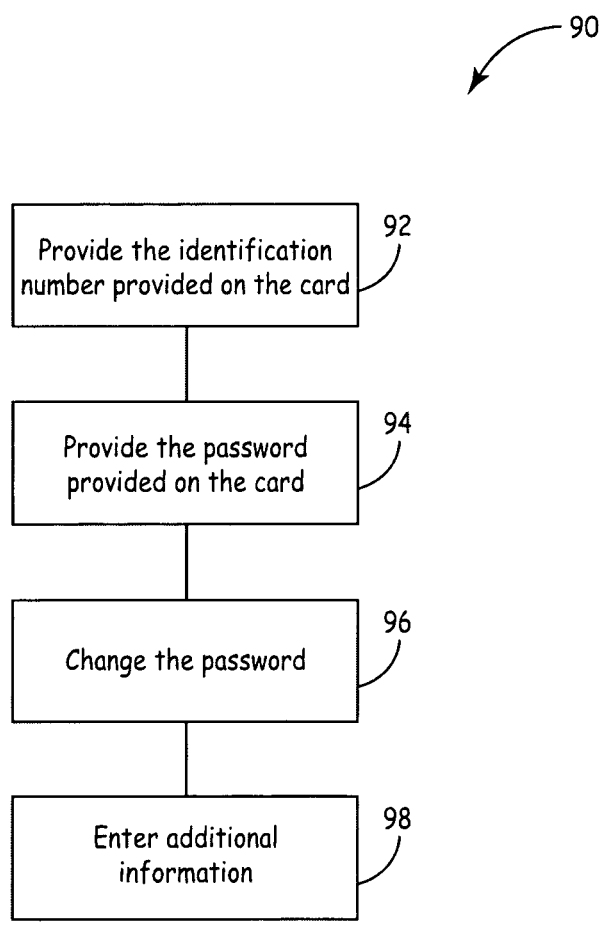
FIG. 9 is a block diagram of a method of registration in accordance with one embodiment of the present invention.

FIG. 9 illustrates a further embodiment of the express registration card system wherein password protection is provided. Registration includes providing the express registration number, as indicated at box 92. In addition, the user may also provide the password, as indicated at box 94. The password may be provided on the card or provided by the retailer separately from the card. According to one alternative embodiment, the system and method of the present invention then requires the user to change the password for security purposes, as indicated at box 96. Additionally, the user may provide additional information such as personal and event information (generally "identification information") to be associated with the registry, as indicated at box 98.

Figure 13:
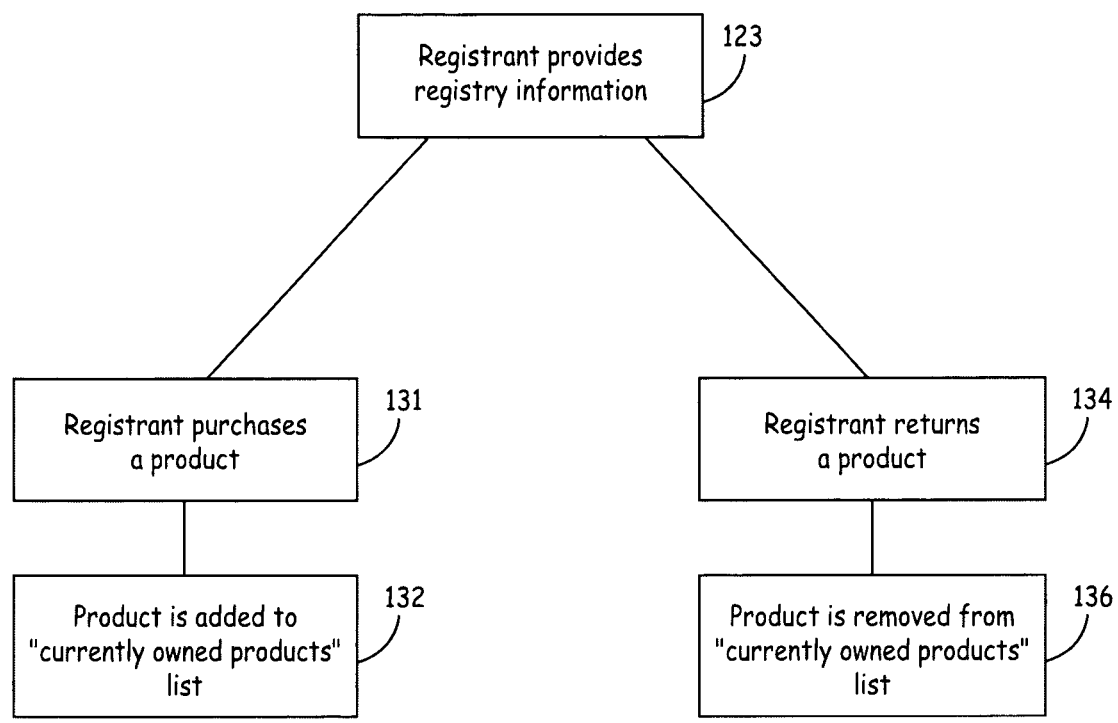
FIG. 13 is a flow chart for a reverser registry system in accordance with another embodiment of the present invention.

FIGS. 5a and 5b illustrate one embodiment of an express registration card. The card includes an express registration number 55, a optional password 57, and a bar code 58 containing information that can be inputted into a scanner by scanning the bar code 58. The bar code may reflect the express registration number, thereby eliminating the need for the express registration number, or the express registration number may be used for identification in lieu of the bar code, thereby eliminating the need for the bar code. Other mediums may be used in lieu of a bar code. For example, a mag stripe may be used. According to one embodiment, the card includes instructions for the user relating to registration 56. The actual express registration number 55, password 57, bar code 58, and instructions 56 depicted in FIG. 13 are merely exemplary and not intended to limit the scope of the present invention. Alternatively, the card can also include radio frequency identification ("RFID") technology, whereby the card can be identified using RFID technology upon enabling the card or whenever the user carrying the card is in the store. The RFID-enabled card can also use the RFID technology to create registry lists. In another embodiment, the card is preaddressed as a post-card with space for pertinent information about the registrant and event that would then be mailed back to the sponsoring institution for data entry.

In accordance with another embodiment, shown in FIGS. 7a and 7b, an express registration card is a loyalty program card, a membership card, a gift card, or other type of store issued card. In this embodiment, to create a registry list, the registrant scans their loyalty program card or membership card and the system uses the coding of the loyalty program card or membership card to associate the registry list with the registrant. In one embodiment, the registrant can create a unique password or PIN for the card for security purposes.

Use of the express registration card greatly simplifies the registration equipment needed in an individual retail store as shown in FIG. 2. For example, the store may provide only a scanner connected to a wireless communication port that connects the scanner to the central offices and a plurality of express registration cards.

Reverse Registry System

A reverse registry system is provided by which a registrant creates a list of goods already owned. This list may be referred to as a reverse registry list. The reverse registry may be used in conjunction with and/or in alternative to the registry of products desired. The reverse registry list provides a shopping guide for a potential gift giver who would like to know the recipient's current preferences in order to select a gift particularly suited to the registrant. Thus, a potential gift giver may accurately identify which video game, music CD, video, etc., that the recipient would enjoy based upon what they have already. Further, using information from the reverse registry, a store clerk may help identify possible gifts especially suited to the registrant. It is also helpful to the gift buyer who is trying to understand the specific 'taste' of the recipient.

The reverse registry further ensures that the potential gift giver does not duplicate items already owned by the registrant.

Figure 12:
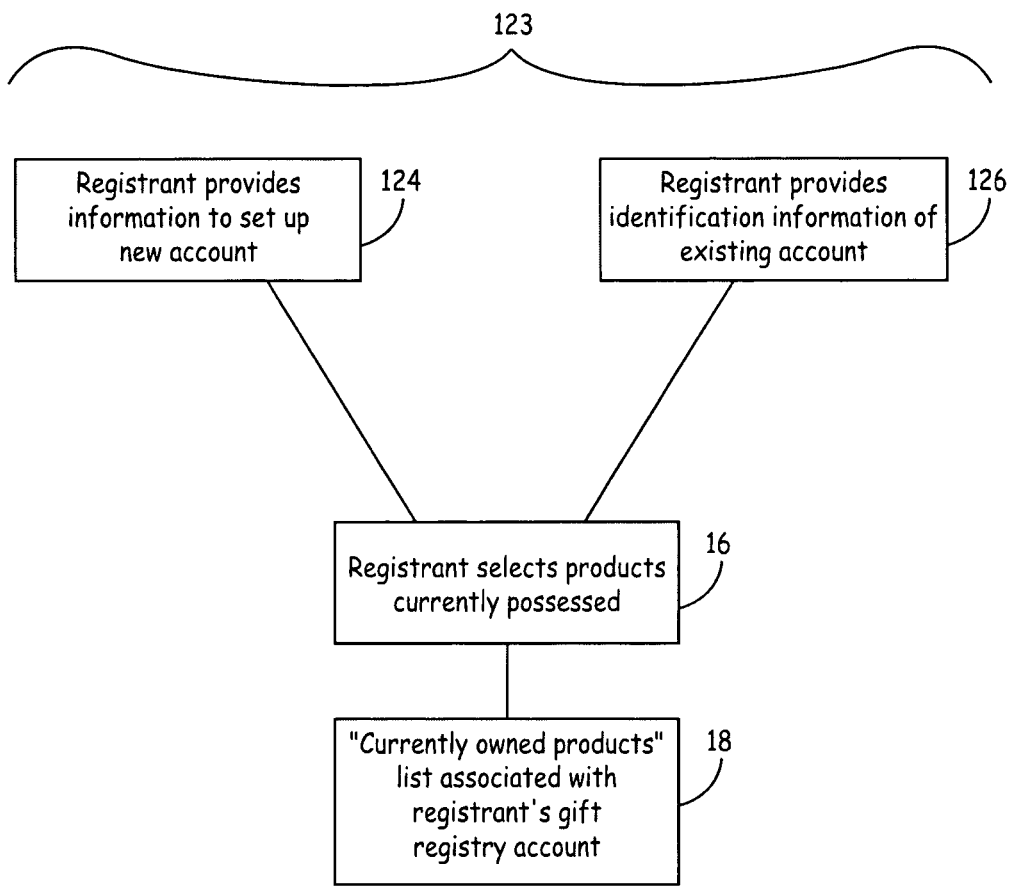
FIG. 12 is a flow chart for a reverser registry system in accordance with one embodiment of the present invention.

FIG. 12 illustrates a flow chart for one embodiment of the reverse registry system. A registrant provides registry account information (or identification information) to the merchant as indicated by 123. Registry account information may include personal information that is required to set up a registry account, as indicated at box 124. Alternatively, registry account information may include information regarding an existing gift registry account as indicated at box 126. Alternatively, registry account information may be provided at a later time by using an express registration card as described previously.

After the registry account is successfully established based on the registry account information, the registrant may select products currently owned as indicated at box 128. The products may be selected through a variety of means, including scanning a bar code displayed on the product with a scanning device such as bar code scanner 40 as previously described. By selecting the products owned by the registrant, a "currently owned products" list is created and associated with the registry account as indicated at box 130. Alternatively, the currently owned products list may be provided in other manners known to those skilled in the art. For example, the currently owned products list may be provided by the registrant using a computer-readable form, a handwritten list, or by selecting products from the merchant's website.

In an alternative embodiment shown in FIG. 13, a product is added to the registrant's currently owned products list each time the registrant purchases a product, as indicated at boxes 131 and 132. Additionally, a product is removed from the registrant's currently owned products list each time the registrant returns a product from the list, as indicated at boxes 134 and 136.

Figure 14:
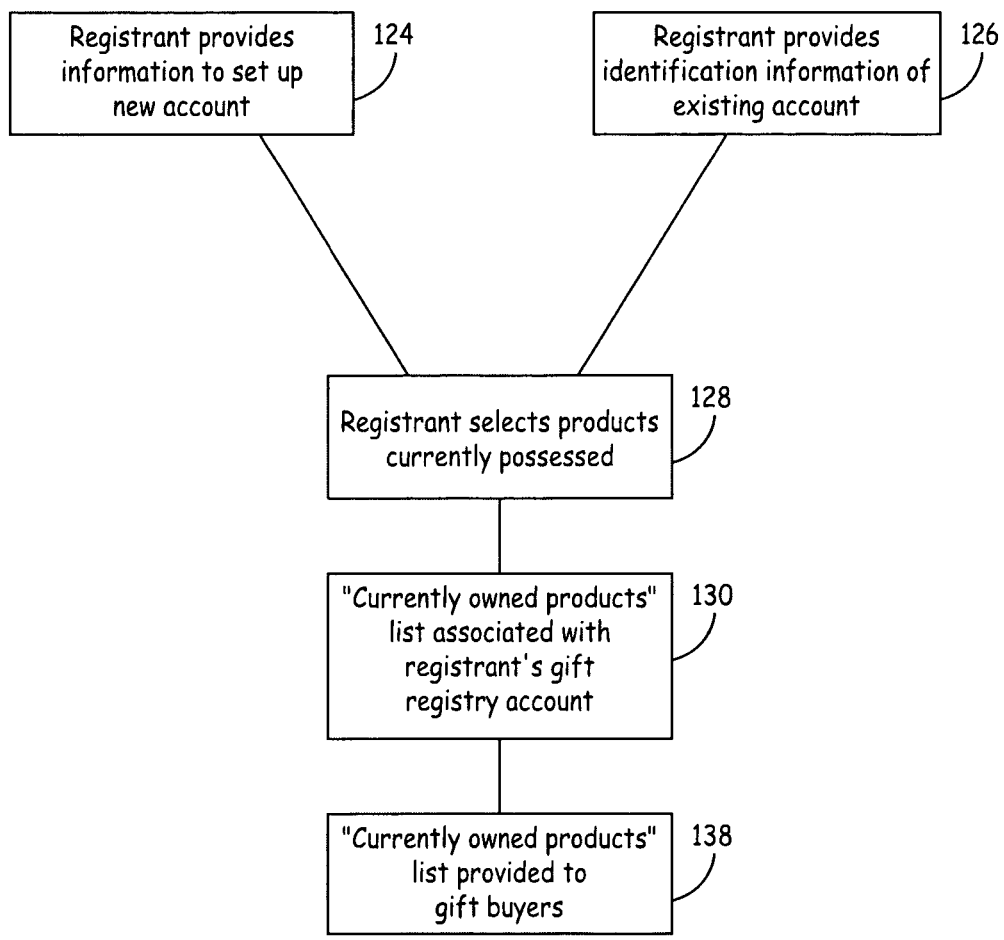
FIG. 14 is a flow chart for a reverser registry system combined with a registry list in accordance with one embodiment of the present invention.
Figure 15:
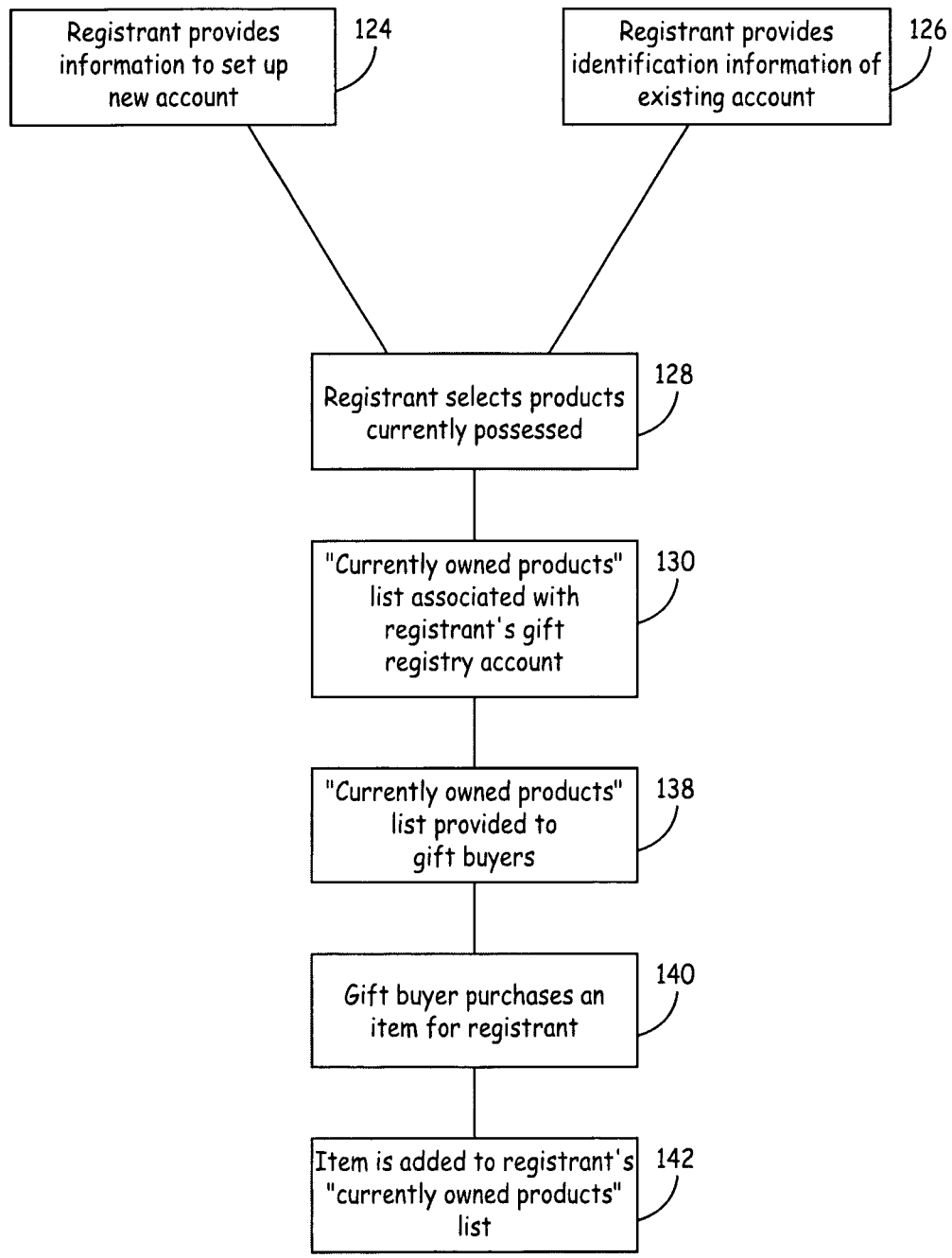
FIG. 15 is a flow chart for a reverser registry system combined with a registry list in accordance with another embodiment of the present invention.

As indicated at box 138 in FIG. 14, the currently owned products list may be provided to one or more gift buyers. The list may be provided to gift buyers via a merchant, such as from a kiosk located at a merchant's retail location, from a merchant's website, or directly from the registrant. Alternatively, rather than providing the entire list to the gift buyers, a gift buyer may be alerted only if she attempts to purchase a product for the registrant that is included on the registrant's currently owned products list. Each time a gift buyer purchases a product for the registrant, the product may be added to the registrant's currently owned products list, as indicated at boxes 140 and 142 in FIG. 15.

Figure 16:
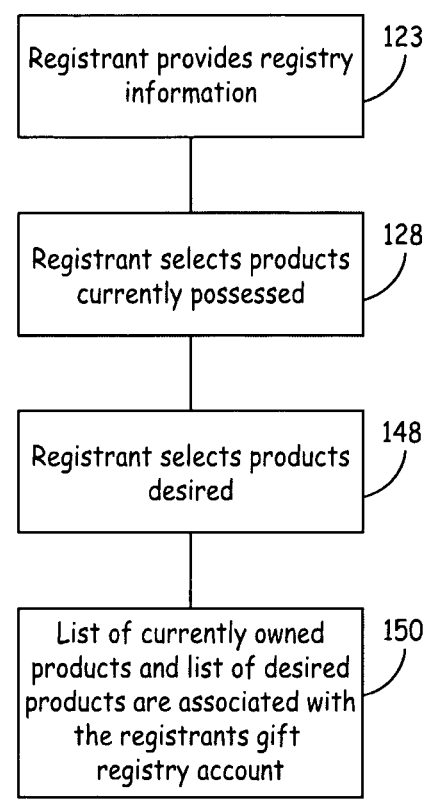
FIG. 16 is a flow chart for a reverser registry system combined with a registry list in accordance with a further embodiment of the present invention.

In another embodiment illustrated in FIG. 16, the registrant provides a second list of products that the registrant desires as indicated at box 148. This list of products reflects a standard gift registry list. The second list of desired products may be created in a similar fashion as that of the list of currently owned products previously described or by other means known in the art. The list of currently owned products and the list of desired products are associated with the registrant's registry account, as indicated at box 150. The second list may further be provided to one or more gift buyers and used by the gift buyers in conjunction with the reverse registry list in determining an appropriate product to purchase for the registrant. An example of this use would be for students to register for what they think they need to go to college and then share the list with their new roommate so they can compare what they have with what they may need.

For example, one manner of conjunctive use of the two lists described above for a single registrant arises when a gift buyer desires to purchase a substitute/alternate product in replacement of one of the products that is on the desired products list of the registry; i.e., the gift buyer wishes to personally select a product not on the registry list and purchase "off registry." By first verifying that personally selected gift is not on the registrant's list of currently owned products, the list aids the gift buyer to avoid purchasing a product that the registrant already owns.

A further example use of the reverse registry is for a parent of a second child who would like to communicate to potential gift givers the items already owned from the first child. The parent may generate a reverse registry indicating such items. The parent may further generate a registry list for items desired. These lists may be combined to fully inform a potential gift giver.

According to a further embodiment, the reverse registry may be used to assess and catalog the registrant's product preferences and tastes. For instance, an electronics merchant may use the reverse registry to determine the registrant's preferred manufacturer, if any. Similarly, a merchant in the business of selling videos and music may use the reverse registry to determine the registrant's favorite genre of videos or recording artists. Such information may be useful in discerning other products the registrant may enjoy. Such information may also allow for generating tailored advertising and promotions, or offering select deals to each registrant.

Figure 17:
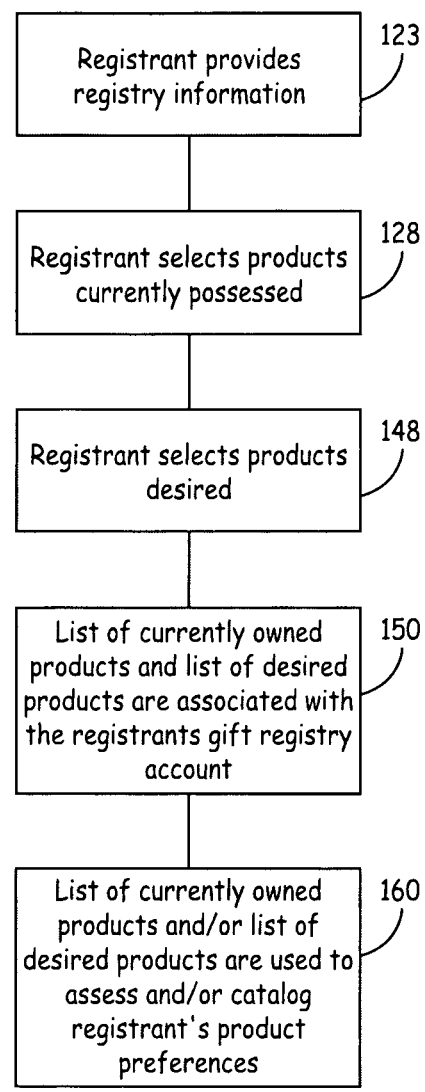
FIG. 17 is a flow chart for a reverser registry system combined with a registry list in accordance with yet a further embodiment of the present invention.

As discussed above, the reverse registry may further be used in conjunction with a second list, provided by the registrant, of products that the registrant desires, as indicated at box 160 in FIG. 17. The additional use of the desired products list aids in assessing and cataloging the registrant's product preferences.

Although the invention has been described with reference to preferred embodiments, persons skilled in the art will recognize that changes may be made in form and detail without departing from the spirit and scope of the invention.

We claim:

1. A method for product registering in a registry comprising:
providing a registrant with an express registration card having an express registration number;
inputting into a portable scanning device, the express registration number by the registrant;
receiving, by the portable scanning device, selected product information and storing the selected product information in the portable scanning device in a computer-readable format; and
associating, by the portable scanning device, the selected product information with the express registration number to create a first registry list;
providing an incentive with the express registration card and, after receiving selected product information, providing the incentive to the registrant;
wherein the incentive is a stored value card having a monetary value and a number associated with the stored value card, the number associated with the stored value card being further associated with the first registry list; and increasing, by a gift purchaser using the registry, the monetary value of the stored value card.

2. The method of claim 1, wherein the express registration card is a store loyalty program card, membership card, gift card, or other store-generated card and the express registration number is a number associated with such card.

3. The method of claim 1, further comprising receiving identification information and associating the identification information with the express registration number.

4. The method of claim 3, wherein the identification information comprises personal information, event information, and/or preferences.

5. The method of claim 3, further comprising sending a personal registry card to the registrant after receipt of identification information.

6. The method of claim 3, further comprising sending a welcoming kit to the registrant after receipt of identification information.

7. The method of claim 6, wherein the welcoming kit comprises at least one of a personal registry card, a gift card, or gift registry announcements associated with the first registry list.

8. The method of claim 3, further comprising associating a personal ID number with the first registry list.

9. The method of claim 3, wherein the identification information is received via online communication.

10. The method of claim 3, wherein the identification information is received from a kiosk or in-store computer.

11. The method of claim 3, wherein the identification information is received via a phone, facsimile, or mail.

12. The method of claim 3, wherein the identification information is received after receiving selected product information.

13. The method of claim 1, further comprising providing a second express registration card having a second express registration number, receiving selected product information, associating the selected product information with the second express registration number to create a second registry list; and associating the second registry list with the first registry list to create a master registry list.

14. The method of claim 13, further comprising receiving identification information and associating the identification information with the first registry list, the second registry list, or the master registry list.

15. The method of claim 1, further comprising receiving product purchase information relating to a product purchased by a purchaser for the registrant, and adding the product purchase information to a reverse registry.

16. The method of claim 1, further comprising receiving product purchase information relating to a product purchased by the registrant and adding the product purchase information to a reverse registry.

17. The method of claim 16, further comprising receiving product return information relating to a product returned by the registrant, associating the product return information with the product purchase information relating to the same product, and removing the product purchase information from the reverse registry.

18. The method of claim 3, further comprising receiving selected preference information and associating the selected preference information with the identification information.

19. The method of claim 1, further comprising providing the first registry list to a potential purchaser, receiving product purchase information from the potential purchaser indicating a selected product has been purchased from the first registry list, removing the selected product from the first registry list, and adding the selected product to a reverse registry.

* * * * *